Oct. 10, 1961 G. H. FUEHRER 3,003,773
COUPLING ASSEMBLY WITH POSITIVE LOCK
Filed Feb. 5, 1959 2 Sheets-Sheet 1
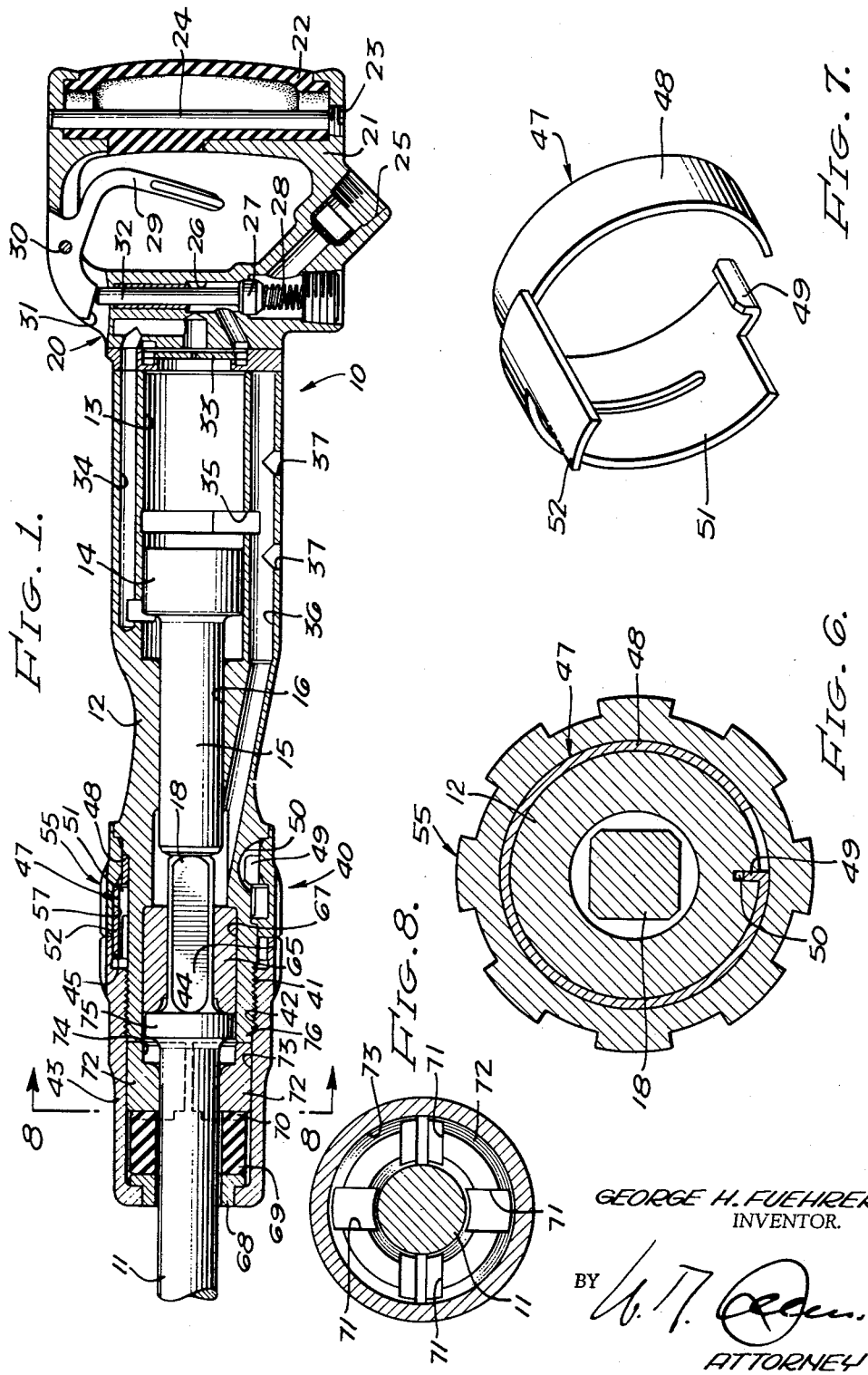
GEORGE H. FUEHRER
INVENTOR.
BY
ATTORNEY Oct. 10, 1961 G. H. FUEHRER 3,003,773
COUPLING ASSEMBLY WITH POSITIVE LOCK
Filed Feb. 5, 1959 2 Sheets-Sheet 2
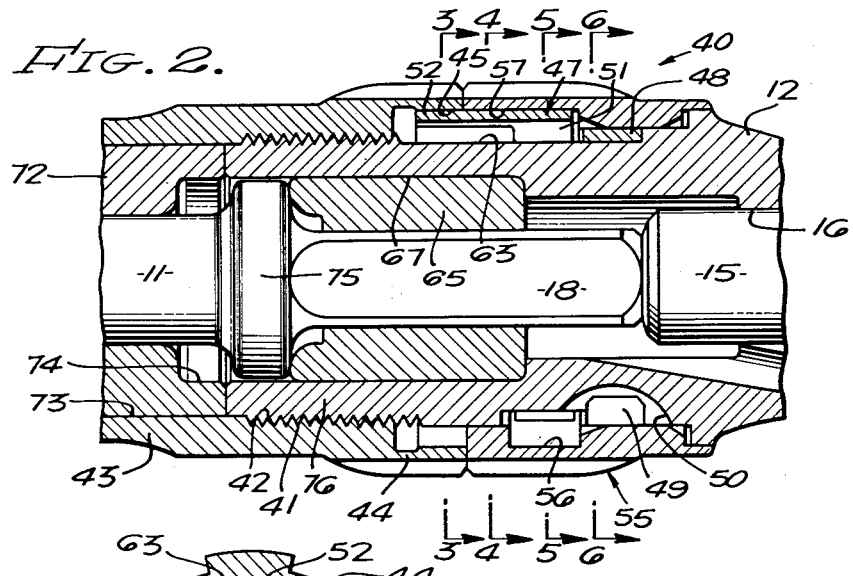
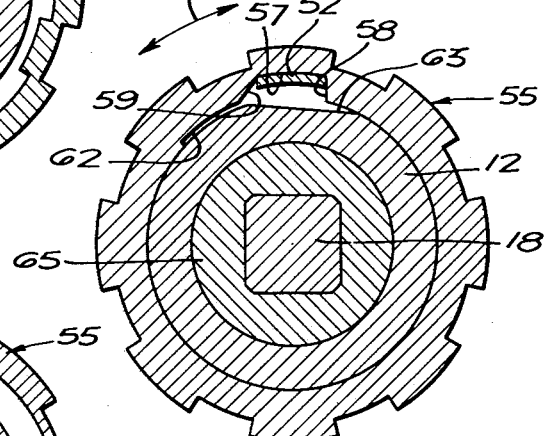
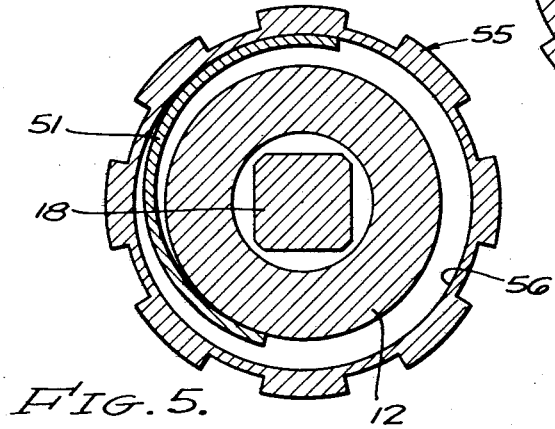
GEORGE H. FUEHRER
INVENTOR.
BY
ATTORNEY

United States Patent Office 3,003,773
Patented Oct. 10, 1961

3,003,773
COUPLING ASSEMBLY WITH POSITIVE
LOCK
George H. Fuehrer, Downey, Calif., assignor to Thor
Power Tool Company, Aurora, Ill., a corporation of
Delaware
Filed Feb. 5, 1959, Ser. No. 791,441
7 Claims. (Cl. 279—19.6)

This invention relates to tubular couplings and more particularly to a coupling adapted to be positively locked in assembled position for use under severe shock and vibration operating conditions such as those encountered, for example, in the operation of pneumatically actuated impact tools.

Pneumatic power tools of the type normally manipulated by an operator have provision at one end for detachably coupling a working tool operatively connected to the unit. A simple and effective type of coupling makes use of a cup-shaped threaded retainer sleeve for holding the working tool assembled to the main body of the power unit. When operating, the piston hammer of the power unit delivers sharp axial thrusts to the inner end of the tool shank, an action attended by shock and vibration throughout the unit. These tend to loosen the screw connection of the retainer sleeve thereby adversely affecting the efficiency of the entire assembly and even permitting the tool to become detached from the power unit. So long as the retainer sleeve is properly tightened, a resilient pressure ring seated within the cup is effective to maintain the retainer sleeve threads loaded thereby aiding materially in keeping the sleeve frictionally loaded against loosening. Slight loosening of the sleeve, however, relieves this resilient pressure following which the sleeve loosens rapidly. Although the referred-to resilient pressure ring and other expedients have proven of value in delaying the loosening of the tool coupling, they have left much to be desired.

Other devices adopted in an attempt to provide a positive lock for the retainer sleeve have utilized pins, keys and similar expedients accessible exteriorly of the tool body. These have the serious disadvantage of providing protrusions extending beyond the exterior surface of the tool coupling thereby interfering objectionably with the use of the coupling assembly as a handgrip in the manipulation of the power unit in actual use. In this connection it is pointed out that typical power units include a handgrip across the outer end adjacent the valve control for the pressurized air supply, the second handgrip being the tool coupling at the opposite end of the power unit. The latter is used particularly in overhead chipping, spading and drilling.

Accordingly, it is a primary object of the present invention to provide an easily manipulated and released positive lock for use in a screw type coupling of general application and more particularly for use in detachably clamping tools to pneumatic power units. The positive lock here provided includes as its essential element a specially designed unitary spring encircling one of the coupling components and arranged to be enclosed by cooperating components of the coupling. The latter include a main coupling sleeve and a lock ring rotatable through a small arc between locked and unlocked positions. In the locked position of the lock ring, a detent of the spring seats in a cooperating recess of the retainer sleeve to lock the same positively against rotation; whereas, in the unlocked position of the lock ring, the spring detent is held out of seating engagement in the recess thereby leaving the retainer sleeve free for rotation and disassembly.

Accordingly, it is a primary object of the present invention to provide an improved coupling assembly incorporating easily released, positive lock means for holding the same selectively in various locked positions.

Another object is the provision of a screw type coupling assembly incorporating an enclosed positive lock readily and selectively operable from the exterior of the coupling to release or to lock the coupling.

Another object of the invention is the provision of a pneumatic power unit having an improved tool coupling featuring a positive lock device.

Another object of the invention is the provision of a pneumatic power unit featuring a combined handgrip and tool coupling assembly utilizing a unitary spring lock device concealed therewithin and including an operator therefor in the form of a rotary ring forming part of the handgrip portion of the tool.

These and other more specific objects will appear upon reading the following specification and claims and upon considering in connection therewith the attached drawings to which they relate.

Referring now to the drawings in which a preferred embodiment of the invention is illustrated:

FIGURE 1 is a longitudinal sectional view through a pneumatic power unit incorporating the positive locking coupling assembly of the present invention;

FIGURE 2 is a fragmentary sectional view on an enlarged scale of the coupling shown in FIGURE 1, the parts being locked in their tightened position;

FIGURES 3, 4, 5 and 6 are cross-sectional views taken respectively along lines 3—3, 4—4, 5—5 and 6—6 on FIGURE 2;

FIGURE 7 is a perspective view of the one-piece locking element; and

FIGURE 8 is a cross-sectional view taken along line 8—8 on FIGURE 1 showing details of the resilient loading device for the coupling.

Referring more particularly to FIGURES 1 and 2, the coupling assembly embodying the present invention is shown incorporated by way of example in a pneumatically actuated power unit designated generally 10 adapted to drive any one of a variety of tools. Shank 11 of a typical tool is shown clamped in place at one end of power unit 10. Inasmuch as power units of this type are well known to the prior art, only a general description of its components need be given. The unit includes an elongated main body or cylinder 12 having a cylindrical bore 13 opening through one end and reciprocally seating therein a piston 14 having an integral stem 15 loosely journalled in axial bore 16. Stem 15 constitutes the hammer of the power unit and will be understood to impart sharp fast-action blows to inner end 18 of tool shank 11 when piston 14 is pneumatically reciprocated.

Suitably clamped across the open end of piston chamber 13 is a backhead assembly 20 having formed as part thereof a handgrip 21. This handgrip preferably includes a hollow resilient grip 22 of elastomeric material held in assembled position by a cap screw 23, the shank 24 of which extends through the grip closely adjacent its inner side wall in the manner clearly illustrated in FIGURE 1.

Backhead 20 is supplied with pressurized air through a hose, not shown, coupled to the backhead by way of the threaded air supply bore 25. The inner end of this passage opens into a valve chamber 26 housing a poppet valve 27 normally spring-pressed against its seat by coil spring 28. The valve is opened to admit air into the piston chamber by a control lever 29 pivotally supported on the handgrip, as by pin 30 with its end 31 bearing against the outer end of valve stem 32. Housed within backhead 20 is a flutter valve 33 of known type operable when pressurized air is supplied to the backhead past valve 27 to admit air alternately to the opposite ends of chamber 13 and thereby to reciprocate piston 14 and impart sharp blows to end 18 of tool shank 11. In this connection it is pointed out that pressurized air is admitted to the left hand end of piston 14, as viewed in FIGURE 1, through passage 34 when valve 33 is in one position, and to the right hand end of piston 14 when valve 33 is in its alternate position. While air is flowing into one end of chamber 13, air previously admitted to the other end of chamber 13 exhausts to the atmosphere through port 35, passage 36 and vents 37.

The positively locking coupling assembly constituting an important feature of this invention, designated generally 40, will now be described, particular reference being had to FIGURES 2 through 7. The left hand end of power unit body 12, as viewed in FIGURE 2, is provided with heavy duty threads 41 adapted to mate with similar threads 42 interiorly of the inlet end of cup-shaped coupling sleeve 43, also known as a tool retainer sleeve. Lip end 44 of retainer sleeve 43 is formed with a plurality of circumferentially spaced detent seating or locking notches 45 for receiving the extension of a locking member to be described presently.

The locking member, designated generally 47, and best shown in FIGURE 7, is formed of sheet spring metal and is generally circular in form for concentric assembly about the forward or shank end of main body cylinder 12. Locking member 47 includes a spring ring 48 having a radially disposed tank 49 at one end adapted to seat snugly in a receiving radial recess 50 (FIGURES 1 and 6) formed in main body 12 of the power unit. Integral with split ring 48 in an area adjacent tank 49 is an L-shaped resilient member, the longer leg 51 of which is of arcuate shape. The axially disposed shorter leg or locking extension 52 of this L-shaped member is positioned to seat in the adjacent one of the locking recesses 45 (FIGURE 3) of retainer sleeve 43 when the latter is properly located. As is best shown in FIGURES 5 and 7, arcuate leg 51 of the L-shaped extension has one end lying closely adjacent the exterior of the shank end of power unit body 12, whereas its opposite end carrying the locking extension 52 is radially spaced therefrom to lie closely adjacent the inner side wall of retainer sleeve 43 for a purpose which will be better made clear presently.

Resilient locking member 47 is held assembled on the shank of the power unit by means of a locking ring 55 in the manner illustrated in FIGURES 2, 4, 5 and 6. Locking ring 55 is loosely journalled about the shank end of power unit body 12 and its exterior surface is axially grooved to mate with the similarly grooved exterior of retainer sleeve 43, these two rings cooperating to provide a non-slip handgrip for the operator. The right hand end of locking ring 55, as viewed in FIGURE 2, fits loosely over the exterior of the split ring portion 48 of locking member 47 and cooperates to hold the anchoring tang 49 thereof seated in the anchoring recess 50 (FIGURE 2). An intermediate portion of the interior side wall of locking ring 55 has an annular inwardly-opening groove 56 (FIGURES 2 and 5) within which the arcuate longer leg 51 of locking member 47 is seated. Opening axially through one radial wall of groove 56 is a narrow channel 57 slightly wider than extension 52 of the locking member. One side wall 58 (FIGURE 4) of channel 57 is generally radially disposed, whereas the opposite side wall 59 is inclined sharply with respect to the radius of the locking ring to provide a cam surface 59 effective to depress locking extension 52 radially inward out of recess 57 upon rotation of ring 55 clockwise as viewed in FIGURE 4. It will also be understood that the camming of extension 52 out of recess 57 simultaneously shifts the extension radially out of one of the recesses 45 in retainer sleeve 43.

The locking and unlocking of extension 52 from one of recesses 45 is thus seen to be accomplished simply by rotating locking ring 55 through the short distance indicated by arrow 61 in FIGURE 4. When locking ring 55 is in the position shown in FIGURE 4, extension 52 is fully seated in both recess 57 of the locking ring and in an axially aligned recess 45 of retainer sleeve 43, thereby positively locking sleeve 43 against rotation relative to threads 41 of power unit body 12. However, if locking sleeve 55 is rotated clockwise through the distance represented by arrow 61, it will be recognized that cam 59 acts to depress extension 52 radially inwardly and onto the arcuate seating surface 62 completely clear of recesses 45 of retainer sleeve 43. In this position of locking extension 52, sleeve 43 is free to be tightened or loosened as desired, it being pointed out that extension 52 is enabled to occupy the described position on surface 62 by reason of the flat relief 63 provided along the juxtaposed surface of the power unit body 12.

There remains to be described the components enclosed by retainer sleeve 43 and cooperating therewith in holding sleeve 43 tightly coupled to the power unit and shank 18 of the working tool operatively assembled to the power unit. The components referred to include a sleeve 65 of suitable bearing material having a snug frictional fit in a well 67 at the left hand end of main body 12. The outer or bottom end of retainer sleeve 43 has a large opening seating a bushing 68. Bearing against the inner end of bushing 68 is a heavy duty rubber buffer ring 69 having a loose fit with tool shank 11. The outwardly facing end of buffer ring 69 is formed with several radial ribs 70 shaped to seat in radial recesses 71 of a pair of semi-circular retainer elements 72. Retainer elements 72 are held pressed outwardly against the interior side wall 73 of retainer sleeve 43 by the cylindrical surface of tool shank 11 and more particularly by the resilient pressure applied by buffer ring 69 when sleeve 43 is tightened to the position of the parts illustrated in FIGURE 1. The outwardly facing end of retainer elements 72 is provided with recess 74 to receive freely the annular flange 75 of tool shank 11. The outer rim edges of elements 72 cooperate with the adjacent end of bearing 65 in limiting the to-and-fro axial movement of tool shank 11. It will also be observed that the outer lip edge of retainer halves 72 are held pressed firmly against end 76 of power unit body 12 by the pressure supplied by buffer cushion 69 in the properly and fully assembled position of retainer sleeve 43.

The mode of assembling and disassembling coupling 55 will be quite apparent from the foregoing detailed description of its components and their operative relationship to one another. Let it be assumed that the coupling has been fully assembled and tightened to the position shown in FIGURES 1 and 2. In this position resilient buffer cushion 69 is maintained under axial compression by sleeve 43 thereby holding elements 72 pressed firmly against end 76 of the power unit body 12 thereby maintaining threads 41 and 42 of the coupling firmly and frictionally engaged to prevent loosening of these parts. In addition and supplementing the action of buffer cushion 69 is the positive locking action provided by locking member 47 and locking extension 52, this extension being resiliently held seated in one of the recesses 45 of retainer sleeve 43. Under these conditions lock ring 55 is in its locking position illustrated in FIGURE 4 wherein extension 52 is fully seated in the bottom of recess 57. The shallow grooves extending lengthwise along the exterior of locking ring 55 and retainer sleeve 43 will then be aligned and will provide a very firm gripping surface readily grasped by the left hand of the operator while using the pneumatic tool. These aligned slots cooperate with one another and with the hand of the operator in preventing unintended and accidental rotation of the locking sleeve to disengage extension 52 from recess 45. The operator may proceed to use the tool in the usual manner with his right hand grasping the resilient grip 72 in position to manipulate the valve control lever 29 to control the flow of air to the piston chamber and his left hand grasping coupling assembly 40.

If it is desired to replace the working tool with another, or to disassemble coupling 40 for any reason, this is accomplished by rotating locking ring 55 clockwise, as viewed in FIGURE 4, through the short distance represented by arrow 61. In so doing cam 59 acts to depress extension 52 inwardly and onto surface 62 wherein extension 52 is completely free of locking recesses 45 in retainer sleeve 43. The latter may be then unscrewed from threads 41 allowing shank 11 of the tool to be withdrawn from the cup-shaped retainer and replaced by the shank of a different tool. Thereafter, the coupling is reassembled and locking ring 55 is rotated counterclockwise allowing the resilient locking extension 52 to resume its locking position in recess 57 of the locking ring and in the aligned one of recesses 45 of retainer sleeve 43. If one of recesses 45 is not aligned with extension 52, slight rotation of retainer sleeve 43 will correct any misalignment allowing extension 52 to reseat and positively lock the coupling in its fully tightened position.

While the particular coupling assembly with positive lock herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In combination with a pneumatically actuated tool, a coupling for detachably securing a tool assembled thereto, said coupling including a retainer sleeve having a screw thread junction with a mounting member therefor, a retainer lock rotatably supported on said mounting member adjacent one end of said sleeve, a resilient locking member carried by said mounting member engageable with said sleeve to prevent rotation thereof relative to said mounting member, said retainer lock being movable between a first position wherein said locking member is operable to lock said sleeve against rotation and a second position wherein said locking member is held inoperative to lock said retainer sleeve against rotation.

2. A coupling for holding a pair of members detachably assembled in axial alignment, said coupling including a first elongated main body member, a second elongated member, a retainer sleeve having a notched rim and concentrically arranged about one end of said second member and having a screw threaded connection with the adjacent end of said first member, spring means anchored to said first member and including a portion movable into and out of positive locking engagement with said sleeve, and means enclosing said spring means and actuatable to control the position of said spring means.

3. A coupling as defined in claim 2 characterized in that said spring enclosing means comprises a lock sleeve encircling said first mentioned member.

4. A coupling as defined in claim 3 characterized in that said retainer sleeve and said lock sleeve have generally similar external diameters with one pair of ends closely adjacent one another.

5. A locking spring for use in locking a tool coupling in closed position, said spring being formed in one piece and including a split ring having a radially extending tab adjacent one end adapted to seat in a radial notch to hold said spring against rotation about its own axis, the other end of said split ring having a radius differing from the radius of said first mentioned end and being adapted to engage behind a shoulder to resist axial movement of said spring, said spring also having an L-shaped extension, the longer leg of said extension being arcuate and extending beside said split ring and the shorter leg thereof extending laterally and axially of said spring, and said L-shaped extension being adapted to be flexed radially into and out of locking engagement with seating recesses formed in the wall of a coupling ring.

6. A locking spring as defined in claim 5 characterized in that said L-shaped extension is offset radially from said split ring.

7. A coupling assembly comprising a tubular member threaded at one end, a lock operating ring rotatably journalled thereon adjacent said threads, a locking ring having interlocking engagement with said tubular member and held non-rotatably assembled thereto by said lock operating ring, a retainer sleeve having threads mating with the threads of said tubular member, said sleeve having a series of circumferentially spaced notches therein, said lock ring having an extension positioned to seat in an adjacent one of said notches, and said lock operating ring being operable to control the seating of said extension in a notch of said retainer sleeve.

References Cited in the file of this patent

UNITED STATES PATENTS

| 1,481,643 | Jimerson | Jan. 22, 1924 |
| 1,701,631 | Slater | Feb. 12, 1929 |
| 1,787,178 | Stevens | Dec. 30, 1930 |
| 2,052,079 | Caestecker | Aug. 25, 1936 |
| 2,527,757 | Mitchell | Oct. 31, 1950 |
| 2,591,769 | Beechler | Apr. 8, 1952 |
| 2,641,835 | Greenmun | June 16, 1953 |

UNITED STATES PATENT OFFICE
CERTIFICATE OF CORRECTION

Patent No. 3,003,773                 October 10, 1961

George H. Fuehrer

It is hereby certified that error appears in the above numbered patent requiring correction and that the said Letters Patent should read as corrected below.

Column 3, line 25, for "spring" read -- split --; line 26, for "tank" read -- tang --.

Signed and sealed this 3rd day of July 1962.

(SEAL)
Attest:

ERNEST W. SWIDER
Attesting Officer

DAVID L. LADD
Commissioner of Patents